United States Patent [19]

Jackovitz et al.

[11] 3,947,292

[45] Mar. 30, 1976

[54] PREPARATION OF AN ALKALINE IRON ELECTRODE MATERIAL USING SULFUR ACIDS

[75] Inventors: John F. Jackovitz, Monroeville; Earl A. Pantier, Verona, both of Pa.

[73] Assignee: Westinghouse Electric Corporation, Pittsburgh, Pa.

[22] Filed: Apr. 18, 1973

[21] Appl. No.: 352,856

Related U.S. Application Data

[63] Continuation-in-part of Ser. No. 116,378, Feb. 18, 1971, abandoned.

[52] U.S. Cl. ............................................. 136/25
[51] Int. Cl. ......................................... H01m 43/04
[58] Field of Search ........ 136/25; 260/439 R, 429 K

[56] References Cited
UNITED STATES PATENTS

| | | | |
|---|---|---|---|
| 3,162,688 | 12/1964 | Thigpen, Jr. et al | 260/439 R |
| 3,193,463 | 7/1965 | Schiveizer | 260/439 R |
| 3,494,900 | 2/1970 | Morita et al. | 260/439 R |
| 3,499,887 | 3/1970 | Cooper et al. | 260/439 R |
| 3,507,696 | 4/1970 | Jackovitz et al. | 136/25 |
| 3,551,466 | 12/1970 | Gee et al. | 260/439 R |
| 3,607,863 | 9/1971 | Dosch | 260/439 R |

*Primary Examiner*—John H. Mack
*Assistant Examiner*—C. F. LeFevour
*Attorney, Agent, or Firm*—D. P. Cillo

[57] ABSTRACT

A negative electrode plate, for a battery containing at least one positive and one negative electrode plate, with alkaline electrolyte contacting the plates, is made by reacting iron oxides contained within the plate volume with at least one sulfur substituted organic acid of the thiolic, dithiolic, dithionic or mercaptocarboxylic type.

26 Claims, 4 Drawing Figures

(a) THIOACETIC ACID ACTIVATED
(b) MERCAPTO-SUCCINIC ACID ACTIVATED
(c) THIOGLYCOLIC ACID ACTIVATED
(d) THIOBENZOIC ACID ACTIVATED
(e) DITHIODIGLYCOLIC ACID ACTIVATED
(f) 2-MERCAPTOETHANOL ACTIVATED

3,947,292

PREPARATION OF AN ALKALINE IRON ELECTRODE MATERIAL USING SULFUR ACIDS

CROSS REFERENCE TO RELATED APPLICATIONS

The present application is a continuation-in-part application of copending U.S. Pat. application Ser. No. 116,378, filed on Feb. 18, 1971 now abandoned.

BACKGROUND OF THE INVENTION

This invention relates to the process of super activating the negative iron electrode of an iron-nickel or iron-air battery. More particularly, this invention relates to the reaction of sulfur substituted organic acids of the thiolic, dithiolic, dithionic or mercaptocarboxylic types with iron active battery materials to provide activated battery plates.

Certain parameters are fixed in battery cell design, such as grams of iron oxide that can be loaded per cubic centimeter of electrode volume. Therefore, any means of increasing the actual utilization of iron oxide would be highly desirable. Another serious problem in sealed battery cells employing alkaline iron electrodes, has been the vigorous evolution of hydrogen gas during most of the charging process.

The iron battery electrode plate is composed of a finely divided iron powder, deposited or impregnated in a supporting plaque and compacted to a desired density. When pure iron oxide powder is used as an electrode active material in an alkali electrolyte, a battery has limited utilization due to the rapid formation of a passivating film on the iron surface.

To facilitate the discharging of the electrode plate, a reaction promoting additive for the electrode active material is needed. Such an additive should have the ability to activate the entire substance, though present in relatively small amounts.

The addition of ferrous sulfides or elemental sulfur as additives to iron oxide powder in a negative iron electrode is known in the art, as shown in U.S. Pat. No. 2,871,281 to Moulton and U.S. Pat. No. 3,507,696 to Jackovitz. These methods have involved sulfide absorption by the iron electrode from a solution of hydrogen sulfide gas in the electrolyte or mechanical mixing of ferrous sulfide with iron oxide and fusion of elemental sulfur with iron oxide at elevated temperatures.

Our invention relates to a total process which is a less expensive and simpler means for activation of the iron oxide powder. Electrodes activated by our method show an increase in the rate of charge acceptance without appreciable gassing, and their performance can be favorably compared with electrodes activated by the molten sulfur technique, which usually yields outputs in the range of 0.50 to 0.55 amp.-hr/gram of active material.

The reaction of iron oxides with mercaptocarboxylic acids in our method, generally produces a mixture that contains a chelate that is stable against hydrolysis and extremely useful as battery active material. Metal salts of succinic and succinamic acids have been disclosed as detergents and rust inhibitors in U.S. Pat. No. 3,271,310 to Le Suer and U.S. Pat. No. 3,365,477 to Gee, but neither disclose mercapto-succinic acid salts of metals, which are corrosion producers.

SUMMARY OF THE INVENTION

We have found that reaction of iron powders with thioacids and especially with certain sulfur containing organic acids of the thiolic, dithiolic or mercaptocarboxylic types, provides a superactivated iron battery material, and electrodes prepared using this material have improved charge acceptance characteristics when compared to electrodes doped with elemental sulfur or iron sulfide. The battery material of this invention is a mixture of unreacted iron oxides and the reaction product of iron oxides and thioacid and must have a sulfur concentration of at least about 0.01 weight percent total combined and uncombined sulfur.

BRIEF DESCRIPTION OF THE DRAWINGS

For a better understanding of the invention, reference may be made to the accompanying drawings in which.

DESCRIPTION OF THE PREFERRED EMBODIMENTS

One embodiment of a battery, utilizing the active material of our invention, would generally comprise a plurality of alternate negative (iron), and positive (nickel) plates with plate separators therebetween all contacted by alkaline electrolyte and housed in a case having a cover, a vent, and positive and negative terminals. Another embodiment would be the use of this active material in the negative plates of an iron-air battery.

Figure 1:
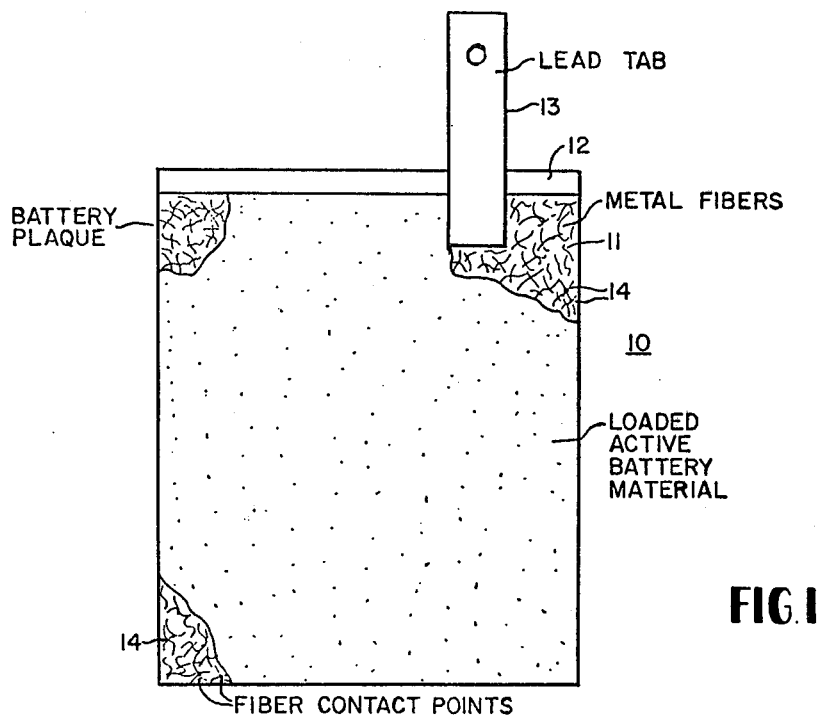
FIG. 1, shows a battery electrode plaque loaded with the active battery material of this invention.

Preferred electrode plaques, shown in FIG. 1 of the drawings, are made from fibers, preferably nickel, or metal coated fibers, such as nickel coated steel or iron. The plaque 10, is a flexible, expansible, compacted sheet of relatively smooth, generally contacting, intermingled, metal fibers as shown at point 11 in the body of the plaque. The plaque has, in the embodiment shown, top edge 12 coined to a high density. The coined area provides a base to which lead tab 13, which is attached to the battery terminals, is spot welded. The plaque is preferably between 75 and 95 percent porous i.e., having a plaque density between 5 and 25 percent of theoretical density. Activated iron electrode material is loaded into the interstices of the body of this fibrous plaque to provide an electrode plate.

The metal fibers are preferably metallurgically diffusion bonded in a protective atmosphere at temperatures up to the melting point of the fibers used. In metallurgical diffusion bonding, the fibers are not melted, If the fibers are melted, protuberances will be formed reducing the active material loading (volume) within the plaque. In the preferred plaque, there should only be a interdiffusion of metal atoms across the metal interface at contact points 14 along the fiber lengths. Metallurgical diffusion bonding provides an electrode structure having a large pore volume into which active material can be pasted or otherwise loaded. Metallurgical diffusion bonding also lowers the electrode plate resistance appreciably and thus the internal cell resistance in a finished cell. This invention can, however, be used with other plaque structures.

The body of active material is a mixture of (1) iron oxides and (2) the reaction product of iron oxides with sulfur substituted organic acids. It can be prepared by chemically reacting iron oxide particles with sulfursubstituted organic acids to form a simple mixture of reacted and unreacted iron oxides. The iron particles are substantially pure finely divided oxide powders generally having an average particle size range of from about 0.2 to 74 microns. The iron particles include at least one oxide of iron or iron oxide hydrate. The iron particle component can include, for example, ferrous oxide (FeO), ferric oxide ($Fe_2O_3$), ferrosoferric oxide ($FeO \cdot Fe_2O_3$ or $Fe_3O_4$), hydrated ferric oxide ($Fe_2O_3 \cdot H_2O$), and mixtures thereof.

Suitable commercial iron oxide compounds include substantially pure iron oxide or iron oxide hydrates such as Mapico Black (from Columbian Carbon Company) containing approximately 99% $Fe_3O_4$ (22% FeO + 77% $Fe_2O_3$) and Meramec 25 (from St. Joseph Lead Company) containing approximately 94% $Fe_3O_4$ and 5% $Fe_2O_3$, with only about 1% total impurities. The iron particle component i.e. iron oxides or hydrated iron oxides cannot contain substantial amounts, over about 10 wt.%, of impurities, such as, for example, MgO, BaO, CaO, $SiO_2$ or $Al_2O_3$ or the active battery electrode material will be poisoned and not useful in battery electrode plates, because of poor electrode capacity values, i.e. in the range of about 0.05 to 0.1 amp hr/gr. after about 15 cycles.

The iron particle component can be activated by reacting with sulfur substituted organic acids of the thiolic types, such as for example, thioacetic acid (thiolacetic acid), thio-isopropionic acid, thio-formic acid and thiobenzoic acid; and dithiolic types, such as for example, dithiodiglycolic acid and dithiodibenzoic acid. Examples of contact with a thiolic type acid includes the reactions:

$$FeO + 2H-S-\overset{O}{\underset{\parallel}{C}}-CH_3 \rightarrow Fe(S-\overset{O}{\underset{\parallel}{C}}-CH_3)_2 + H_2O;$$

ferrous oxide thioacetic acid iron thio salt and $$Fe_2O_3 + 6H-S-\overset{O}{\underset{\parallel}{C}}-CH_3 \rightarrow 2[Fe(S-\overset{O}{\underset{\parallel}{C}}-CH_3)_3] + 3H_2O$$

ferric oxide thioacetic acid iron thio salt $$\overset{6H_2O}{\rightarrow} 2[Fe(O\overset{O}{\underset{\parallel}{C}}CH_3)_3] + 6H_2S$$
$$\underset{\text{excess } 2Fe_2O_3}{\downarrow}$$
$$4FeS + 2S + 6H_2O$$
iron sulfide In the reactions above, a major portion, up to about 99% of the iron oxides remain unreacted. When ferrous oxide is completely reacted with thioacetic acid, the reaction product is dark green iron (II) thioacetate, a compound that is stable at room temperature. Heating the solid or boiling with water causes rapid decomposition yielding a variety of products including iron sulfide and hydrogen sulfide. The corresponding reaction with ferric oxide is quite complex as shown above, yielding iron (III) thioacetate. Iron (III) thioacetate is not stable at room temperature and hydrolyzes slowly, eventually yielding iron acetate, iron sulfide and sulfur. For the sulfur containing thiolic acids, the electrode activator it is believed comprises a mixture of the iron thio-salt and iron sulfide.

The sulfur substituted organic acids of the thiolic type useful in this invention are water soluble and have the structural formula:

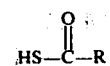

wherein R is selected from the group consisting of a hydrogen radical, linear alkyl radicals having from 1 to 5 carbon atoms, the monovalent branched carbon chain radical:

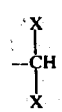

wherein X is selected from the group consisting of alkyl radicals having from 1 to 4 carbon atoms, monovalent organic homocyclic or carbocyclic radicals selected from the group consisting of $-C_6H_5$ phenyl and $-C_5H_4$ cyclopentyl radicals, monovalent organic heterocyclic radicals selected from the group consisting of $-C_5H_4N$ pyridyl and $-C_4H_3O$ furyl, and monovalent organic alicyclic radicals such as $-C_6H_{11}$ cyclohexyl radicals.

The sulfur substituted water soluble organic acids of the dithiolic type useful in this invention have the structural formula:

wherein Y is selected from the group consisting of divalent radicals selected from the group consisting of $-CH_2OCH_2-$, and $-C_2H_4OC_2H_4-$, and divalent organic homocyclic radicals such as $-C_6H_4-$.

The iron particle component can also be activated by contact with sulfur substituted organic acids of the mercapto-carboxylic types, such as mercapto-succinic acid (thiomalic acid, $HOOCCH(SH)CH_2COOH$), thioglycolic acid (mercapto-acetic acid), mercapto-propionic acids and mercapto-butyric acids. An example of contact with a mercapto-carboxylic acid includes the reaction:

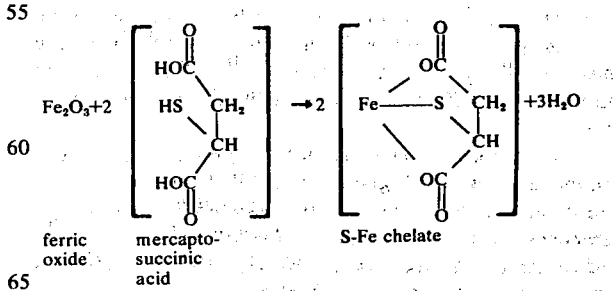

ferric oxide — mercapto-succinic acid — S-Fe chelate

In the reaction above, a major portion, up to about 99%, of the iron oxide remains unreacted. The reaction product of iron (III) oxide and mercaptosuccinic acid is a chelate of 1:1 stoichiometry. This chelate is stable against hydrolysis and the electrode can be said to initially contain no iron sulfide or elemental sulfur. The organic sulfur-iron chelate it is believed acts initially as the electrode activator in this case.

The sulfur substituted water soluble organic acids of the mercapto-carboxylic type useful in this invention can have a structural formula selected from the group consisting of:

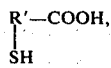

wherein R' can be selected from the group consisting of divalent aliphatic hydrocarbon radicals having from 1 to 5 carbon atoms, divalent organic homocyclic radicals such as —$C_6H_4$—, and divalent organic alicyclic radicals such as —$C_6H_{10}$—, wherein the (SH) group can attach to any R' carbon atom, and

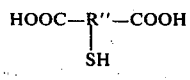

wherein R" can be selected from the group consisting of trivalent aliphatic hydrocarbon radicals having from 1 to 4 carbon atoms wherein the (SH) group can attach to any R" carbon atom. Mixtures of these acids may also be used.

Other sulfur substituted organic acids which are useful when alcohol is used as a solvent instead of water are dithionic acids having the structural formula:

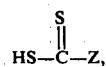

wherein Z is selected from the group consisting of alkyl radicals having from 1 to 4 carbon atoms, a hydrogen radical, and monovalent organic homocyclic or carbocyclic radicals selected from the group consisting of —$C_6H_5$ and —$C_5H_4$ radicals. The dithionic acids are not as useful as the other acids heretofore described because they are insoluble in water and relatively unstable at room temperature.

Superactivated iron electrode materials which consist of (1) the reaction product of iron oxides and sulfur substituted organic acids to form iron-sulfur compounds plus (2) unreacted iron particle components, prepared as described above, must have a total combined and uncombined sulfur concentration in the range of from about 0.01 to 2.0 weight percent sulfur, based on the weight of iron-sulfur compounds plus unreacted iron oxides, for acceptable electrochemical performance in batteries. The preferred total sulfur range is from about 0.01 to 1.0 weight percent sulfur. Above about 2.0 weight percent and electrode performance significantly deteriorates. It is preferred to first load the plate with iron oxides and then react the iron oxides by dipping the plate in a sulfur acid. This provides complete and intimate mixing and distribution of the reacted and unreacted iron oxide components. However, it is also possible to react iron oxides with sulfur acids to form iron-sulfur compounds, and then mix the iron-sulfur compounds as a powder with iron oxides in amounts effective to provide a total sulfur content of from about 0.01 to 2 wt.% and then load the powder into the plate.

EXAMPLE I

Six, 1 $in^2$ metallurgically bonded, expansible nickel fiber electrode plaques, about 85% porous, were loaded with an aqueous slurry of iron powder having an upper limit particle size of about 44 microns (325) mesh and a composition of about 94.0% $Fe_3O_4$, 5.0% $Fe_2O_3$ and 1% total impurities (Sold under the trade name Meramec 25 by St. Joseph Lead Company). The iron oxide loaded plaques were then dried, weighted, and soaked at room temperature for about one-half hour in 200 ml. aqueous solutions of 0.1 molar:

a. thioacetic acid,
b. mercapto-succinic acid,
c. thioglycolic acid,
d. thiobenzoic acid,
e. dithiodiglycolic acid, and
f. 2-mercaptoethanol ($HSCH_2CH_2OH$).

Figure 2:
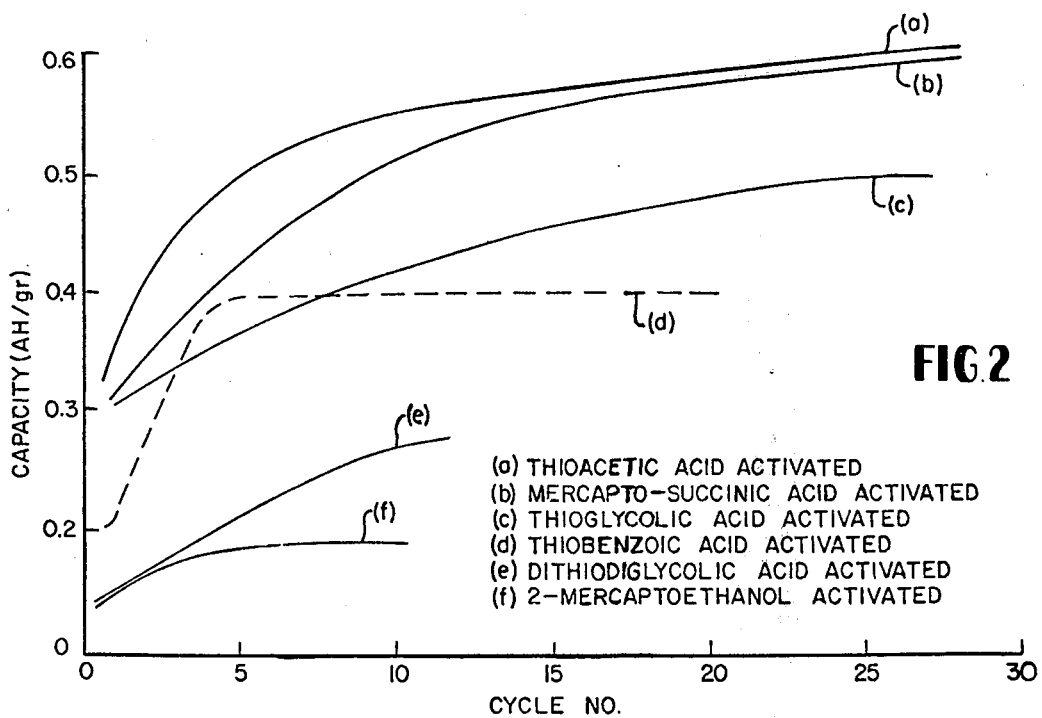
FIG. 2 is a graph showing the relative performance of several sulfur containing activators in iron electrodes.

The activated plates (a–e) and plate (f) were then dried and weighed, and electrochemical test data for each was obtained using a single nickel-iron battery plate system in 25 weight percent KOH electrolyte, using a drain rate of 110 mA/$in^2$ for 30 cycles (charge and discharge). The electrochemical performances of each of the plates is shown in FIG. 2 of the drawings.

Electrodes activated with thioacetic, thioglycolic and mercapto-succinic acids gave excellent outputs, as these materials are highly acidic and react quickly with the iron oxide surface. Electrodes activated with thiobenzoic acid and dithiodiglycolic acid showed moderate capacity. The thiobenzoic acid activator has very limited solubility in water and was too weakly acidic to react quickly with the iron oxide. Electrodes superactivated with thioacetic and mercapto-succinic acids attained an output of about 0.58 to 0.62 amp-hrs/gram of electrode active material after 25 cycles.

The electrode dipped with 2-mercaptoethanol gave poor electrochemical capacity relative to the others, leveling off very quickly, since 2-mercaptoethanol does not contain an acid group and affords no significant reaction with the iron oxide.

Figure 3:
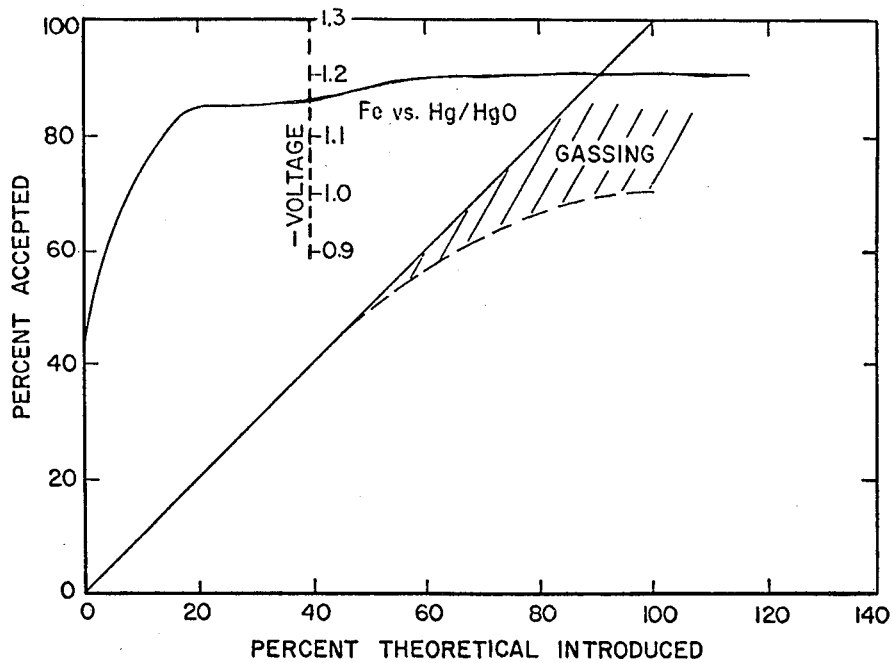
FIG. 3, is a graph showing the charge acceptance characteristics of iron electrodes activated with thioacetic acid.
Figure 4:
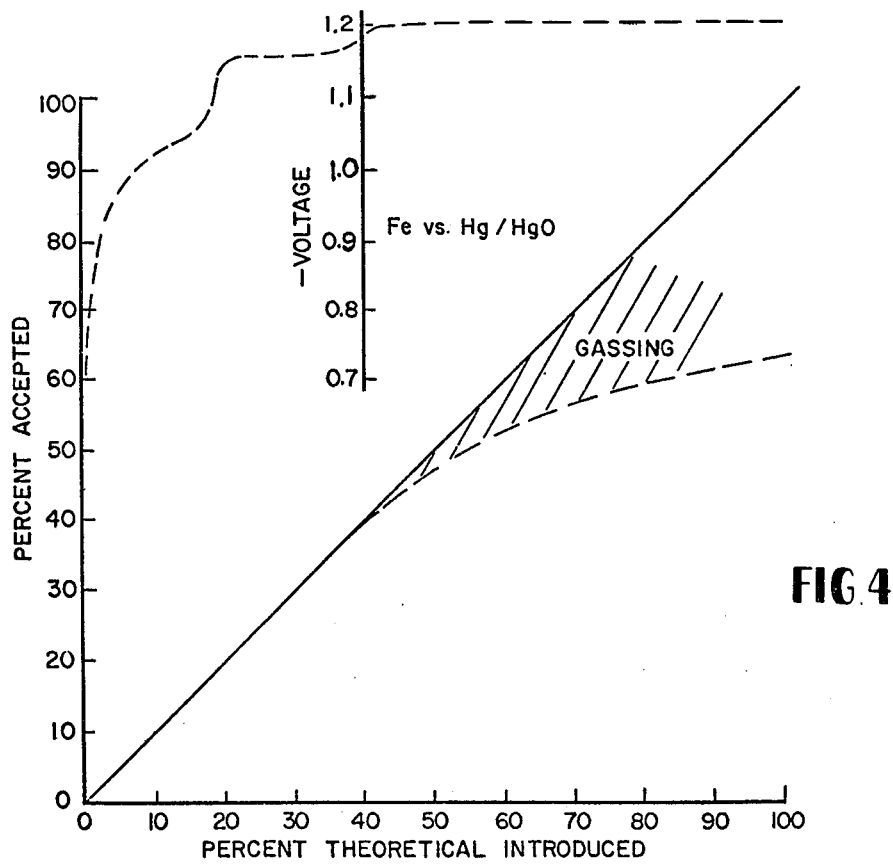
FIG. 4, is a graph showing the charge acceptance characteristics of iron electrodes activated with mercaptosuccinic acid.

Charge acceptance curves of iron electrodes activated with thioacetic and mercapto-succinic acids, measured by the volume of hydrogen liberated from the electrode during the charging process, at a charge density of 333mA/$in^2$, are shown in FIGS. 3 and 4 of the drawings. A reproducible plateau between 1.15 and 1.22 volts versus a Hg/HgO reference electrode was observed for the superactivated electrode, during which the electrode accepts charge at a high rate with negligible evolution of hydrogen gas. As can be seen from FIGS. 3 and 4, gassing becomes a factor only after about 55% of the theoretical charge has been accepted by the electrode. Such performance allows shorter charging time and is particularly advantageous for sealed battery cells or cells in which vigorous evolution of hydrogen gas is detrimental.

The ratio of total sulfur content for the active material, mixture containing iron-sulfur compounds and unreacted iron oxides, within electrode plates a-e and plate f is shown in Table 1:

Table 1

| Plate | (a) | (b) | (c) | (d) | (e) | (f) |
|---|---|---|---|---|---|---|
| Loading (gr. oxide/in²) | 1.45 | 1.52 | 1.46 | 1.77 | 1.77 | 1.92 |
| Total Sulfur (wt. %) | 0.42 | 0.31 | 0.19 | 0.05 | 0.05 | 0.05 |

Total sulfur content of the battery material mixture, which contains unreacted iron oxide particles, and the reaction product of iron oxide particles and sulfur substituted organic acids to form iron-sulfur compounds, was determined using a National Bureau of Standards combustion technique. A weighed amount of active material was ignited and the evolved sulfur dioxide was collected in an acid solution of potassium iodide containing starch. Standardized potassium iodate solution was used to titrate to the starch-iodide endpoint.

EXAMPLE II

Activated electrode plates (g) and (h) were prepared as in Example 1, except that they were soaked for 12 hours in 200 ml. of 0.1 molar aqueous solutions of:
  g. thioacetic acid and
  h. mercapto-succinic acid.

Electrochemical test data for each was obtained as in Example 1. Electrodes (g) and (h), superactivated for a longer period with thioacetic and mercapto-succinic acids, attained an output of about 0.70 amp-hrs./gram of electrode active material after 25 cycles. The longer exposure of the iron oxide to the acid resulted in electrodes with higher efficiency having battery material containing about 1 wt.% total sulfur.

We claim:

1. An activated iron electrode material suitable for use in a battery electrode plate consisting essentially of (1) iron particles consisting essentially of substantially pure iron oxides selected from the group consisting of FeO, $Fe_2O_3$, $Fe_3O_4$, $Fe_2O_3 \cdot H_2O$ and mixtures thereof and (2) the chemical reaction product of an iron particle component consisting essentially of substantially pure iron oxides selected from the group consisting of FeO, $Fe_2O_3$, $Fe_3O_4$, $Fe_2O_3 \cdot H_2O$ and mixtures thereof and at least one sulfur substituted organic acid selected from the group consisting of thiolic, dithiolic, and mercapto-carboxylic acids, said mixture containing about 0.01 to 2 weight percent total sulfur.

2. The electrode material of claim 1 wherein the sulfur substituted organic acid has the structural formula:

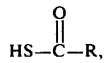

wherein R is selected from the group consisting of a hydrogen radical, linear alkyl radicals having from 1 to 5 carbon atoms, the monovalent branched carbon chain radical:

wherein X is selected from the group consisting of alkyl radicals having from 1 to 4 carbon atoms, monovalent homocyclic radicals selected from the group consisting of $-C_6H_5$ and $-C_5H_4$ radicals, monovalent heterocyclic radicals selected from the group consisting of $-C_5H_4N$, and $-C_4H_3O$ radicals, and the monovalent alicyclic radical $-C_6H_{11}$.

3. The electrode material of claim 1 wherein the sulfur substituted organic acid is selected from the group consisting of thioacetic acid and thiobenzoic acid and wherein the mixture contains from about 0.01 to 1 weight percent sulfur.

4. The electrode material of claim 1 wherein the sulfur substituted organic acid has a structural formula selected from the group consisting of:

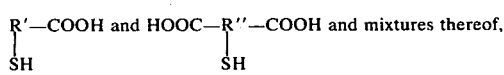

wherein R' is selected from the group consisting of divalent aliphatic hydrocarbon radicals having from 1 to 5 carbon atoms, the divalent homocyclic radical $-C_6H_4-$, and the divalent alicyclic radical $-C_6H_{10}-$, and wherein R'' is selected from the group consisting of trivalent aliphatic hydrocarbon radicals having from 1 to 4 carbon atoms.

5. The electrode material of claim 1 wherein the sulfur substituted organic acid is selected from the group consisting of mercapto-succinic acid and thioglycolic acid and wherein the mixture contains from about 0.01 to 1 weight percent sulfur.

6. The electrode material of claim 1 wherein the sulfur substituted organic acid has the structural formula:

wherein Y is selected from the group consisting of divalent radicals selected from the group consisting of $-CH_2OCH_2-$ and $-C_2H_4OC_2H_4-$, and the divalent homocyclic radical $-C_6H_4-$.

7. The electrode material of claim 1 wherein the sulfur substituted organic acid is dithiodiglycolic acid and wherein the mixture contains from about 0.01 to 1 weight percent sulfur.

8. A battery electrode plate comprising a supporting plaque loaded with iron electrode material consisting essentially of
  1. iron particles consisting essentially of substantially pure iron oxides selected from the group consisting of FeO, $Fe_2O_3$, $Fe_3O_4$, $Fe_2O_3 \cdot H_2O$ and mixtures thereof and
  2. the chemical reaction product of an iron particle component consisting essentially of substantially pure iron oxides selected from the group consisting of FeO, $Fe_2O_3$, $Fe_3O_4$, $Fe_2O_3 \cdot H_2O$ and mixtures thereof and at least one sulfur substituted organic acid selected from the group consisting of thiolic, dithiolic, and mercaptocarboxylic acids, said mixture containing about 0.01 to 2 weight percent total sulfur.

9. The electrode plate of claim 8 wherein the plaque is between 75 and 95 percent porous and comprises metallurgically bonded metallic fibers.

10. The electrode plate of claim 9 wherein the mixture contains about 0.01 to 1 weight percent sulfur, and the iron particles have an average particle size range of from about 0.2 to 74 microns.

11. The electrode plate of claim 9 wherein the sulfur substituted organic acid has the structural formula:

$$HS-\overset{O}{\underset{\|}{C}}-R,$$

wherein R is selected from the group consisting of a hydrogen radical, linear alkyl radicals having from 1 to 5 carbon atoms, the monovalent branched carbon chain radical:

$$-\underset{\underset{X}{|}}{\overset{\overset{X}{|}}{C}}H,$$

wherein X is selected from the group consisting of alkyl radicals having from 1 to 4 carbon atoms, monovalent homocyclic radicals selected from the group consisting of $-C_6H_5$ and $-C_5H_4$ radicals, monovalent heterocyclic radicals selected from the group consisting of $-C_5H_5N$, and $-C_4H_3O$ radicals, and the monovalent alicyclic radical $-C_6H_{11}$.

12. The electrode plate of claim 9 wherein the sulfur substituted organic acid is selected from the group consisting of thioacetic acid and thiobenzoic acid.

13. The electrode plate of claim 9 wherein the sulfur substituted organic acid has a structural formula selected from the group consisting of:

$$\underset{\underset{SH}{|}}{R'}-COOH \text{ and } HOOC-\underset{\underset{SH}{|}}{R''}-COOH$$

wherein R' is selected from the group consisting of divalent aliphatic hydrocarbon radicals having from 1 to 5 carbon atoms, the divalent homocyclic radical $-C_6H_4-$, and the divalent alicyclic radical $-C_6H_{10}-$, and wherein R'' is selected from the group consisting of trivalent aliphatic hydrocarbon radicals having from 1 to 4 carbon atoms.

14. The electrode plate of claim 9 wherein the sulfur substituted organic acid is selected from the group consisting of mercapto-succinic acid and thioglycolic acid.

15. The electrode plate of claim 9 wherein the sulfur substituted organic acid has the structural formula:

$$HS-\overset{O}{\underset{\|}{C}}-Y-\overset{O}{\underset{\|}{C}}-SH,$$

wherein Y is selected from the group consisting of divalent radicals selected from the group consisting of $-CH_2OCH_2-$ and $-C_2H_4OC_2H_4-$, and the divalent homocyclic radical $-C_6H_4-$.

16. The electrode plate of claim 9 wherein the sulfur substituted organic acid is dithiodiglycolic acid and wherein the mixture contains from about 0.01 to 1 weight percent sulfur.

17. A battery electrode plate comprising a supporting 75 to 95 percent porous plaque of metallurgically diffusion bonded metal fibers selected from the group consisting of nickel, nickel coated iron and nickel coated steel fibers loaded with an activated iron electrode material consisting essentially of (1) iron particles consisting essentially of substantially pure iron oxides, having an average particle size range of from about 0.2 to 74 microns, selected from the group consisting of FeO, $Fe_2O_3$, $Fe_3O_4$, $Fe_2O_3.H_2O$ and mixtures thereof and (2) the chemical reaction product of an iron particle component consisting essentially of substantially pure iron oxides, having an average particle size range of from about 0.2 to 74 microns, selected from the group consisting of FeO, $Fe_2O_3$, $Fe_3O_4$, $Fe_2O_3.H_2O$ and mixtures thereof and at least one sulfur substituted organic acid selected from the group consisting of thio-acetic acid, thio-isopropionic acid, thio-formic acid, thiobenzoic acid, dithiodiglycolic acid, dithiodibenzoic acid, mercapto-succinic acid, thioglycolic acid, mercapto-propionic acid, and mercapto-butyric acid, wherein the mixture contains from about 0.01 to 2 weight percent sulfur, providing a superactivated iron electrode material.

18. The electrode plate of claim 17 wherein the sulfur substituted organic acid is selected from the group consisting of thioacetic acid and mercapto-succinic acid the fibers are selected from the group consisting of nickel coated iron and nickel coated steel and wherein the electrode material is loaded into the interstices of the body of the fibrous plaque.

19. A method of making a porous battery plate comprising the steps of:
   a. loading an iron particle component consisting essentially of substantially pure iron oxides having an average particle size range of from about 0.2 to 74 microns selected from the group consisting of iron oxide, iron oxide hydrate and mixtures thereof into a porous plaque, and
   b. contacting the iron particle component in the plaque with at least one sulfur substituted organic acid selected from the group consisting of thiolic, dithiolic, and mercapto-carboxylic acids, by soaking the loaded plaque in a solution of the acid, to chemically react iron particles, to provide the iron particle component with about 0.01 to 2 weight percent total sulfur.

20. The method of claim 19 wherein the plaque is between 75 and 95 percent porous and the iron particle component is selected from the group consisting of FeO, $Fe_2O_3$, $Fe_3O_4$, $Fe_2O_3.H_2O$ and mixtures thereof.

21. The method of claim 20 wherein the sulfur substituted organic acid has the structural formula:

$$HS-\overset{O}{\underset{\|}{C}}-R,$$

wherein R is selected from the group consisting of a hydrogen radical, linear alkyl radicals having from 1 to 5 carbon atoms, the monovalent branched carbon chain radical:

$$-\underset{\underset{X}{|}}{\overset{\overset{X}{|}}{C}}H,$$

wherein X is selected from the group consisting of alkyl radicals having from 1 to 4 carbon atoms, monovalent homocyclic radicals selected from the group consisting of —C$_6$H$_5$ and —C$_5$H$_4$ radicals, monovalent heterocyclic radicals selected from the group consisting of —C$_5$H$_5$N, and —C$_4$H$_3$O radicals, and the monovalent alicyclic radical —C$_6$H$_{11}$.

22. The method of claim 21 wherein the sulfur substituted organic acid is selected from the group consisting of thioacetic acid and thiobenzoic acid.

23. The method of claim 20 wherein the sulfur substituted organic acid has a structural formula selected from the group consisting of:

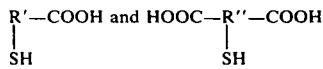

R'—COOH and HOOC—R''—COOH
|                |
SH              SH and mixtures thereof;
wherein R' is selected from the group consisting of divalent aliphatic hydrocarbon radicals having from 1 to 5 carbon atoms, the divalent homocyclic radical —C$_6$H$_4$—, and the divalent alicyclic radical —C$_6$H$_{10}$—, and wherein R'' is selected from the group consisting of trivalent aliphatic hydrocarbon radicals having from 1 to 4 carbon atoms.

24. The method of claim 23 wherein the sulfur substituted organic acid is selected from the group consisting of mercapto-succinic acid and thioglycolic acid.

25. The method of claim 20 wherein the sulfur substituted organic acid has the structural formula:

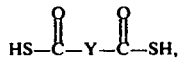

$$HS-\overset{O}{\underset{\|}{C}}-Y-\overset{O}{\underset{\|}{C}}-SH,$$

wherein Y is selected from the group consisting of divalent radicals selected from the group consisting of —CH$_2$OCH$_2$— and —C$_2$H$_4$OC$_2$H$_4$— and the divalent homocyclic radical —C$_6$H$_4$—.

26. The method of claim 25 wherein the sulfur substituted organic acid is dithidiglycolic acid and wherein the reaction product contains from about 0.01 to 1 weight percent sulfur.

* * * * *